US009566729B2

(12) United States Patent
Longo et al.

(10) Patent No.: US 9,566,729 B2
(45) Date of Patent: Feb. 14, 2017

(54) INJECTION MOLDED SURFBOARD INSERT HAVING PRE-IMPREGNATED COMPOSITE FIBER MATRIX STRUCTURE

(71) Applicant: TODOS SANTOS SURF INC., Huntington Beach, CA (US)

(72) Inventors: Vince Longo, Huntington Beach, CA (US); Tony Longo, Laguna Niguel, CA (US); John Griffin, Huntington Beach, CA (US)

(73) Assignee: TODOS SANTOS SURF, INC., Huntington Beach, CA (US)

(*) Notice: Subject to any disclaimer, the term of this patent is extended or adjusted under 35 U.S.C. 154(b) by 34 days.

(21) Appl. No.: 14/251,876

(22) Filed: Apr. 14, 2014

(65) Prior Publication Data

US 2015/0291265 A1    Oct. 15, 2015

(51) Int. Cl.
*B29C 45/14* (2006.01)
*B63B 35/79* (2006.01)
*B29L 31/52* (2006.01)

(52) U.S. Cl.
CPC ... *B29C 45/14008* (2013.01); *B29C 45/14786* (2013.01); *B63B 35/793* (2013.01); *B29C 45/14311* (2013.01); *B29C 2045/14327* (2013.01); *B29L 2031/52* (2013.01); *B29L 2031/5272* (2013.01)

(58) Field of Classification Search
CPC .............. B63B 35/7926; B63B 35/793; B63B 35/7909; B63B 35/7906; B63B 2231/52; B29C 66/7212; B29L 2031/5272
USPC ...................... D21/78, 778; 114/140; 441/74
See application file for complete search history.

(56) References Cited

U.S. PATENT DOCUMENTS

| 4,600,617 A | 7/1986 | Cole |
| 4,804,347 A | 2/1989 | Ross |
| 5,481,763 A | 1/1996 | Brostrom |
| 5,683,100 A | 11/1997 | Enders |
| 5,830,025 A | 11/1998 | Fleming |
| 5,934,962 A | 8/1999 | Daum |
| 8,617,442 B2 | 12/2013 | Dajek |
| 8,802,330 B2 * | 8/2014 | Lee ..................... H01M 8/0213 429/518 |

(Continued)

FOREIGN PATENT DOCUMENTS

| AU | 2011253843 A1 | 6/2013 |
| JP | 2012200897 A | 10/2012 |

OTHER PUBLICATIONS

Thomas, Shane, PCT Notification of Transmittal of the International Search Report and the Written Opinion of the International Searching Authority or the Declaration, Jul. 6, 2015, pp. 1-25.

(Continued)

*Primary Examiner* — Andrew Polay
(74) *Attorney, Agent, or Firm* — Stetina Brunda Garred & Brucker

(57) ABSTRACT

An insert for a water sports board, wherein the insert includes a pre-preg flange extending outwardly from an injection molded central housing to provide enhance structural properties of the insert, as well as enhanced intermediate bonding between the injection molded central housing and a surface polymer. The pre-preg flange further improves the strength to weight ratio when compared to conventional inserts.

7 Claims, 5 Drawing Sheets

(56) References Cited

U.S. PATENT DOCUMENTS

2007/0202760 A1\* 8/2007 Caldwell ............... B63B 35/793
                                                              441/79
2012/0048457 A1    3/2012 Gomes
2013/0244514 A1    9/2013 Scott et al.

OTHER PUBLICATIONS

JAB Surfboards, Les Materiaux, http://www.jabsurfboards.com/technologie/les-materiaux/.

\* cited by examiner

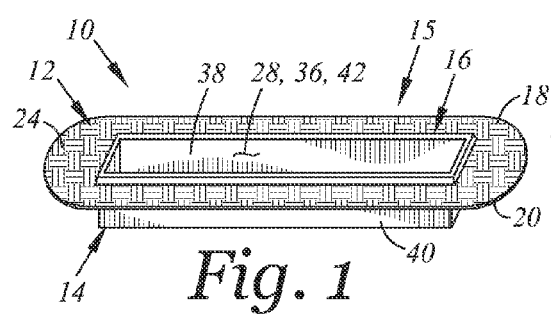
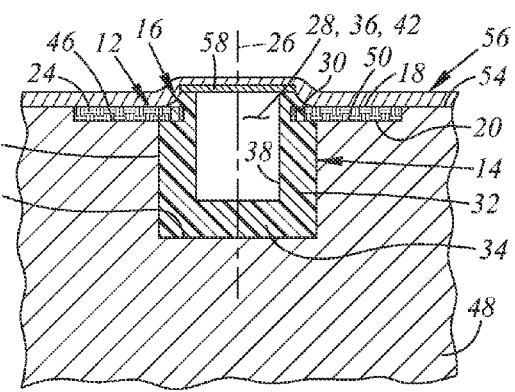
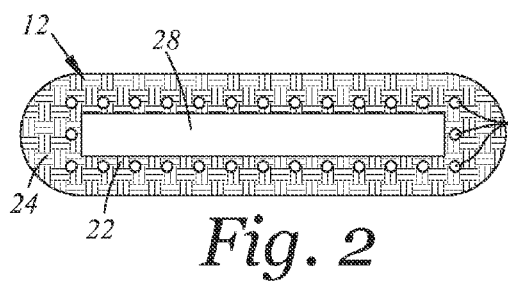
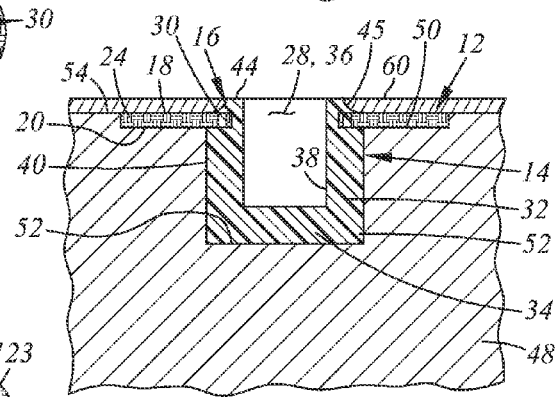
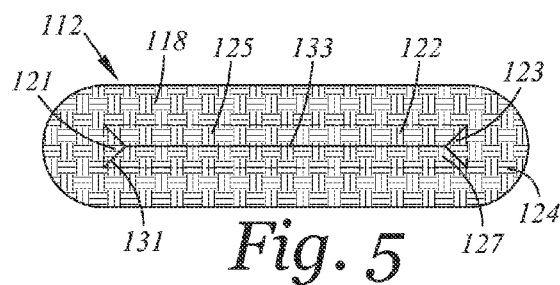
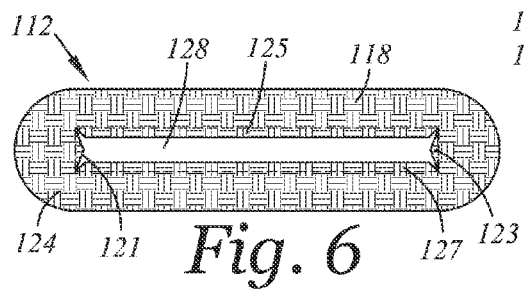
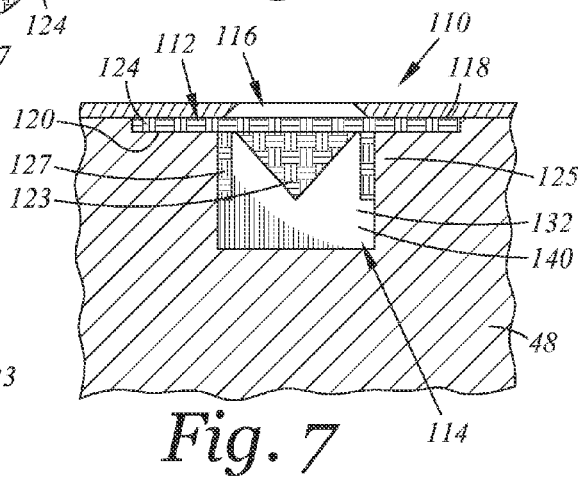

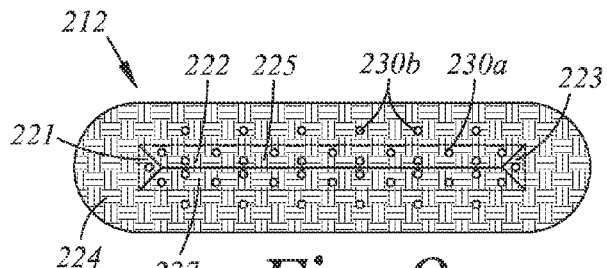
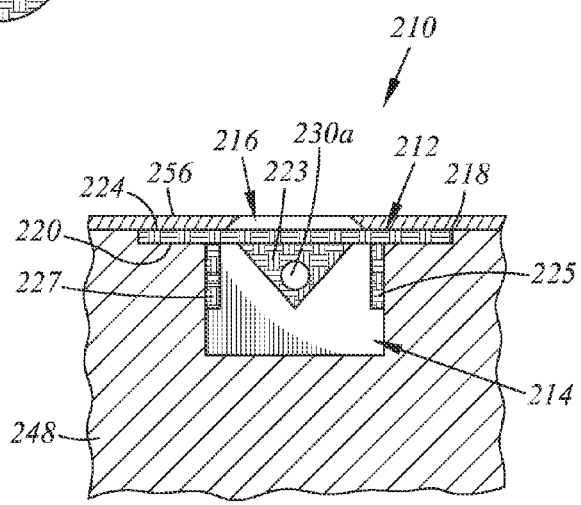
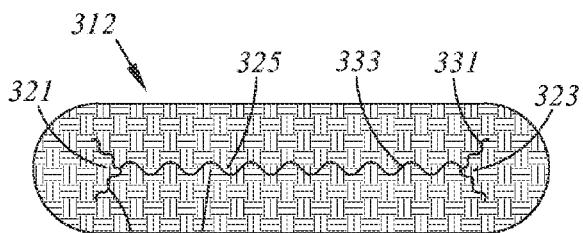
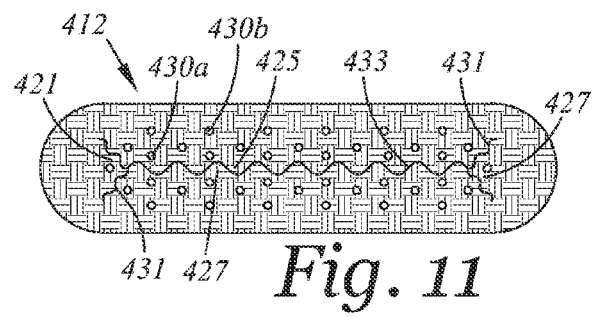

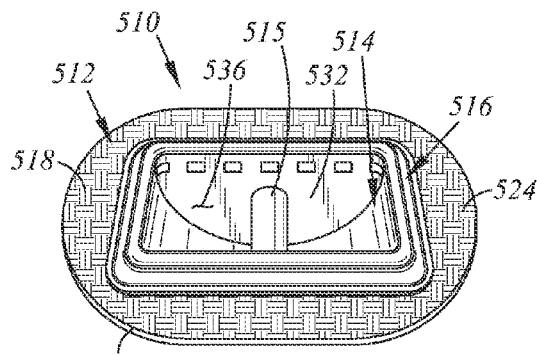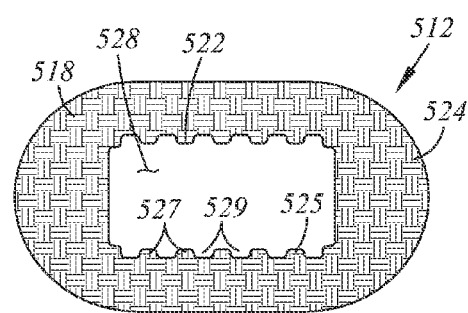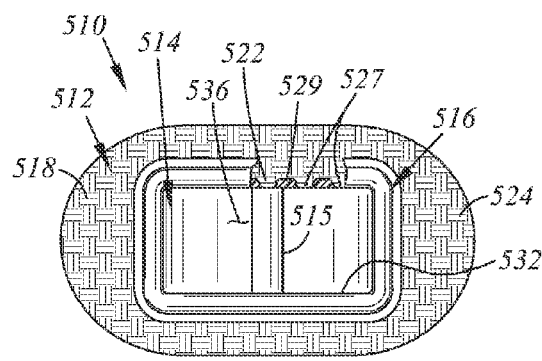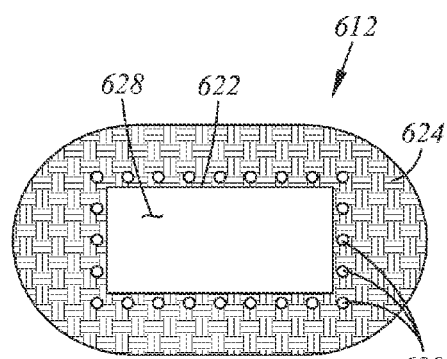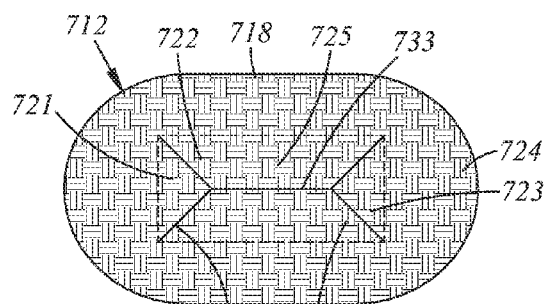

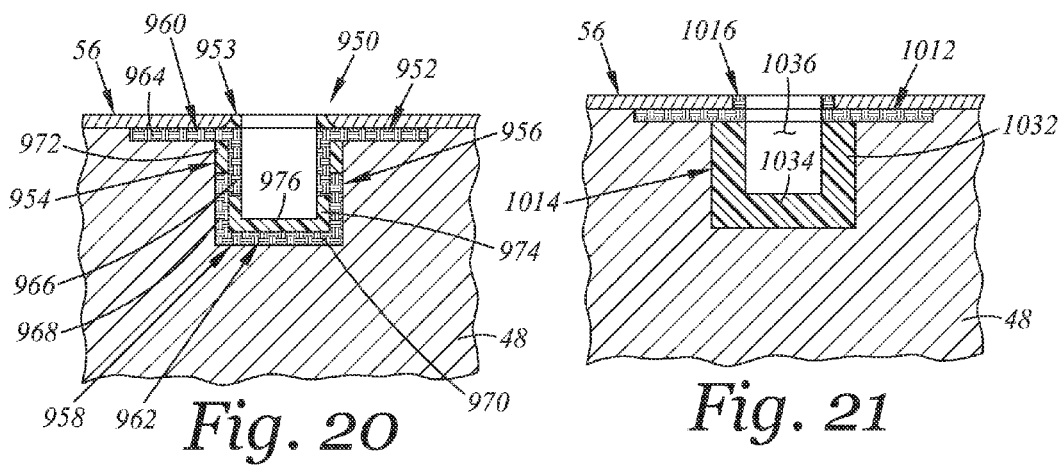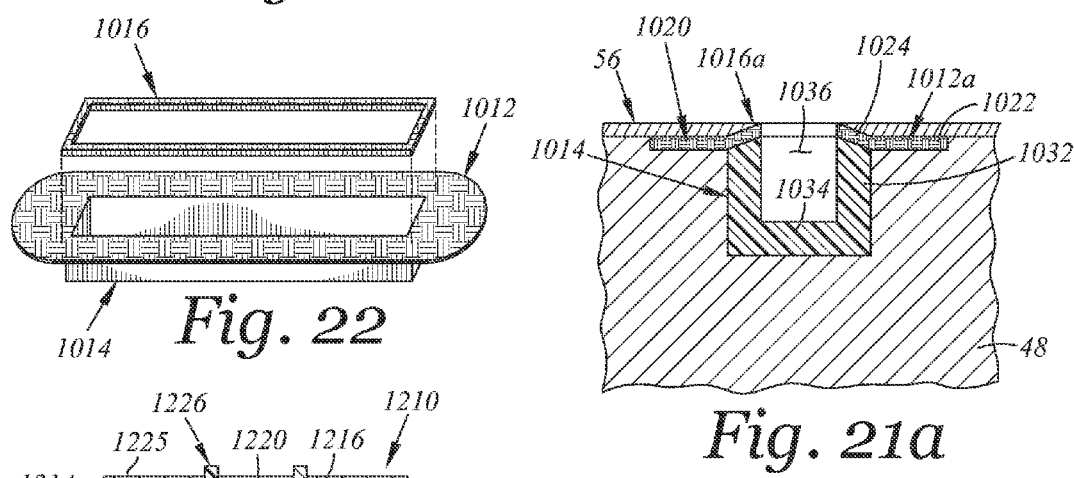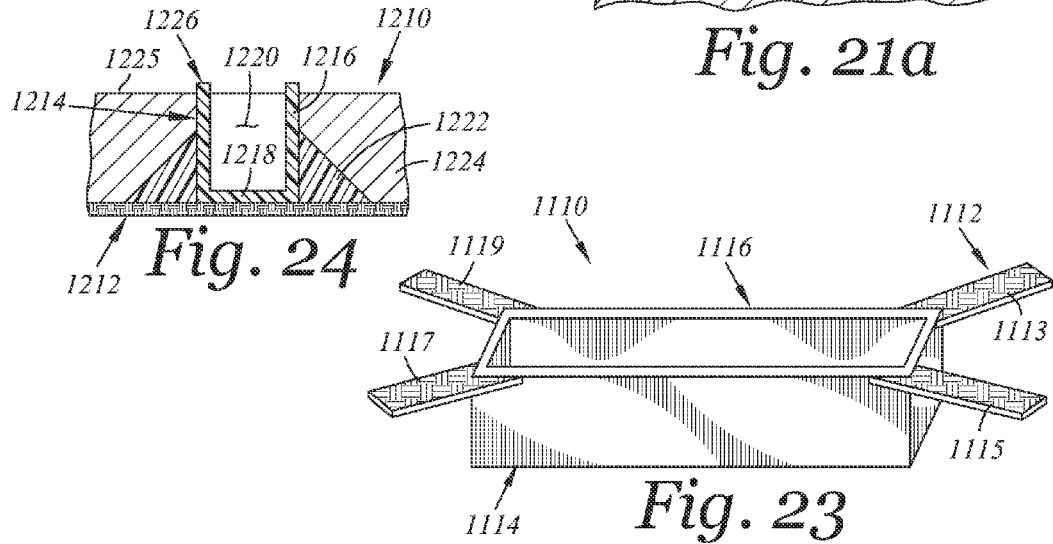

INJECTION MOLDED SURFBOARD INSERT HAVING PRE-IMPREGNATED COMPOSITE FIBER MATRIX STRUCTURE

CROSS-REFERENCE TO RELATED APPLICATIONS

Not Applicable

STATEMENT RE: FEDERALLY SPONSORED RESEARCH/DEVELOPMENT

Not Applicable

BACKGROUND

Technical Field of the Invention

The present invention relates generally to an insert for a water sports board, e.g., a surfboard, and more specifically to an insert having a radially extending pre-impregnated sheet which serves as an intermediate bonding structure between an insert housing and an external polymer coating on the water sports board.

Description of the Related Art

Most surfboards, and other water sports boards, include one or more fins coupled to the board for stability and control. The boards themselves are frequently formed of a foam core with a laminate, such as fiberglass and a laminating resin covering and sealing the core. In the past, fins were often glued directly to the surface of the board and subsequently reinforced with fiberglass patches which were laminated to the board adjacent the fin. However, the process of attaching the fin directly to the surface of the board was generally labor intensive, time consuming and oftentimes did not yield a sufficient bond between the fin and the board.

More recently, fin mounts have been developed which allow the fin to be detachably secured to the board via various fin mount constructions. In order to install the fin mount into the board, the fin mount is typically positioned into the foam core and bonded to the board. Once the fin mount is placed within the foam core, the laminate may be placed over portions of the mount to secure the fin mount to the board. The use of fin mounts and detachable fins also simplified transport of a surfboard. For instance, it is typically easier to place three surfboards in a bag, in an airplane, or stacked in the back of a vehicle when the fins are detached from the surfboards.

Although the development and use of fin mounts has generally simplified the process for attaching the fin to the surfboard, conventional fin mounts typically suffer from certain deficiencies. Most notably, conventional fin mounts oftentimes fail under the stresses and loads experienced while surfing. Another deficiency commonly associated with conventional fin mounts is that they are relatively heavy and therefore, the fin mounts undesirably increase the overall weight of the surfboard.

Therefore, there is a need in the art for an improved mounting device which has an improved strength to weight ratio and provides enhanced bonding between an external laminate and an injection molded mount housing. Various aspects of the present invention address these particular needs, as will be discussed in more detail below.

BRIEF SUMMARY

There is provided an insert, such as a fin mount, for a water sports board, wherein the insert includes a pre-preg flange extending outwardly from a central housing to provide enhanced structural properties. Along these lines, the pre-preg flange is sized and configured to serve as an intermediate bonding structure between the central insert housing and the outer surface polymer so as to enhance the bonding therebetween. The pre-preg flange further improves the strength to weight ratio when compared to conventional inserts.

According to one embodiment, there is provided a board insert sized and configured for use with a water sports board having a recess formed therein. The insert includes a pre-preg flange formed of a pre-preg sheet including a plurality of structural strands bonded by a resin material. The pre-preg flange includes opposed first and second surfaces, an outer peripheral region configured to be attachable to the water sports board, and an inner bonding region disposed radially inward of the outer peripheral region and disposed about a central axis. The insert further includes an insert housing formed from an injection molded material. The insert housing is coupled to the pre-preg flange adjacent the inner bonding region along the central axis. The insert housing is bonded to the inner bonding region of the pre-preg flange with the outer peripheral region of the pre-preg flange extending radially outward from the insert housing. The insert housing includes a peripheral wall disposed about the central axis and extending away from the second surface of the pre-preg flange. An end wall is coupled to the peripheral wall with the peripheral wall disposed between the end wall and the second side of the pre-preg flange. The end wall extends generally orthogonal to the central axis, with the peripheral wall and end wall collectively defining a cavity.

A lip may be coupled to the peripheral wall and extend around the central axis to define a lip opening in communication with the cavity. The lip may extend away from the peripheral wall with the first surface disposed between the lip and the end wall. The lip may define a distal end portion disposed about the lip opening and spaced from the first surface.

The inner bonding region may include a pre-preg opening disposed about the central axis, with the pre-preg opening being sized to receive at least a portion of the peripheral wall of the insert housing. The pre-preg flange may include at least one aperture separate from the pre-preg opening and formed within the inner bonding region, wherein a portion of the insert housing may extend through the at least one aperture. The pre-preg opening may define an inner periphery. The at least one aperture may extend into the pre-preg flange from the inner periphery and in communication with the pre-preg opening. The at least one aperture may be spaced from the inner periphery and the pre-preg opening.

The inner bonding region may be folded relative to the outer peripheral region. The peripheral wall may extend along a portion of the first or second surface of the pre-preg flange.

The plurality of structural strands may be of at least one structural property greater than the injection molded material. The at least one structural property may be selected from the group consisting of: toughness, tensile strength, density, elastic modulus and Young's modulus.

The board insert may be configured such that a majority of the first surface of the pre-preg flange is uncovered by the injection molded material. The board insert may also be configured such that a majority of the second surface of the pre-preg flange is uncovered by the injection molded material.

According to another embodiment, there is provided a method of constructing a board insert configured for use with a water sports board. The method includes the steps of providing a pre-preg flange formed of a pre-preg sheet. The pre-preg flange includes an outer peripheral region configured to be attachable to the water sports board, and an inner bonding region radially inward of the outer peripheral region and disposed about a central axis. The method further includes forming a pre-preg opening within the inner bonding region, and placing the pre-preg flange within a mold cavity. A polymer material is injected into the mold cavity to form an insert housing within the pre-preg opening. The method additionally includes forming a lip coupled to the peripheral wall and extending around the central axis to define a lip opening in communication with the cavity.

The method may additionally include the step of forming at least one aperture within the inner bonding region, with a portion of the insert housing extending through the at least one aperture. The step of forming the at least one aperture may include forming the at least one aperture to be in communication with the pre-preg opening. The step of forming the at least one aperture may include forming the at least one aperture in spaced relation to the pre-preg opening. The injecting step may include injecting the polymer material through the at least one aperture.

According to another embodiment, there is provided a water sports board including a core having a core outer surface and a recess extending therein from the core outer surface. The water sports board further includes a board insert including a pre-preg flange, an insert housing and a lip. A polymer coating extends over the core, with the polymer coating being bonded to the insert housing via the pre-preg flange.

According to yet a further embodiment, there is provided a method of forming a water sports board. The method includes providing a core and an insert box having a pre-preg flange. The insert is placed within a recess formed within the core and a polymer coating is applied over the core and the pre-preg flange. The pre-preg flange serves as an intermediate bonding structure between the polymer coating and the insert box.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is an upper perspective view of a first embodiment of a board insert having an injection molded housing, a lip, and a pre-preg flange;

FIG. 2 is a top view of a first embodiment of a pre-preg flange prior to forming the housing and lip thereto;

FIG. 3 is a side sectional view of the board insert placed within a recess formed within a core of a water sports board, and having a cover extending over a housing opening during application of a polymer coating over the board core;

FIG. 4 is a side sectional view of the board insert shown in FIG. 3, with the cover removed and the polymer coating finished to be substantially flush with the lip;

FIG. 5 is a top view of a second embodiment of a pre-preg flange prior to forming the housing and lip thereto;

FIG. 6 is a top view of the pre-preg flange shown in FIG. 5, with central portions of the flange being folded relative to peripheral portions of the flange;

FIG. 7 is a side sectional view of the second embodiment of the board insert installed in a water sports board and including the pre-preg flange shown in FIGS. 5-6 with the folded central portions forming a portion of the housing;

FIG. 8 is a top view of a third embodiment of a pre-preg flange prior to forming the housing and lip thereto;

FIG. 9 is a side sectional view of a third embodiment of the board insert installed in a surfboard and including the pre-preg flange shown in FIG. 8;

FIG. 10 is a top view of a fourth embodiment of a pre-preg flange prior to forming the housing and lip thereto;

FIG. 11 is a top view of a fifth embodiment of a pre-preg flange prior to forming the housing and lip thereto;

FIG. 12 is an upper perspective view of a leash plug having a pre-preg flange;

FIG. 13 is a top view of the pre-preg flange included in the leash plug shown in FIG. 12;

FIG. 14 is a top view of the leash plug depicted in FIG. 12, with a portion of the lip cutaway;

FIGS. 15-16 are top views of various embodiments of pre-preg flanges which may be incorporated into the leash plug;

FIG. 20 is a side sectional view of an embodiment of an installed board insert having a first pre-preg sheet defining a flange and a portion of an insert peripheral wall, and a second pre-preg sheet defining a portion of the insert peripheral wall and insert end wall;

FIG. 21 is a side sectional view of an embodiment of an installed board insert having a pre-preg flange, a pre-preg lip, and a molded housing;

FIG. 21a is a side sectional view of an embodiment of an installed board insert including a pre-preg sheet forming a flange and a portion of a lip;

FIG. 22 is an upper perspective view of the board insert depicted in FIG. 21, with the pre-preg lip exploded from the pre-preg flange and housing;

FIG. 23 is an upper perspective view of an embodiment of a board insert having separate pre-preg flange segments extending radially outward from discrete portions of a housing; and FIG. 24 is a side sectional view of another embodiment of the board insert having a pre-preg flange disposed adjacent an end wall of the insert housing.

Common reference numerals are used throughout the drawings and detailed description to indicate like elements.

DETAILED DESCRIPTION

Figure 17:
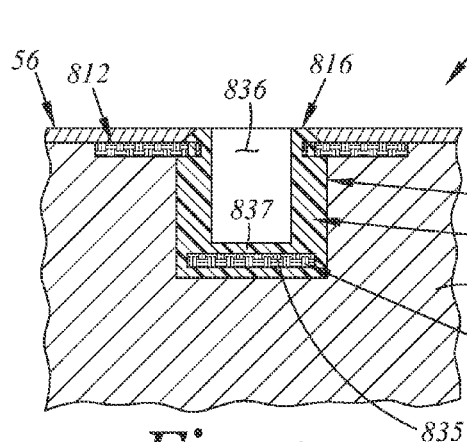
FIG. 17 is a side sectional view of an embodiment of an installed board insert having a pre-preg flange, a molded lip, and a housing including a a pre-preg sheet disposed within the end wall.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring now to the drawings, wherein the showings are for purposes of illustrating a preferred embodiment of the present invention only, and are not for purposes of limiting the same, FIG. 1 depicts a board insert 10 for a water sports board, wherein the insert 10 is specifically configured and adapted to have enhanced bonding characteristics as well as an improved strength to weight ratio when compared to conventional board inserts, such as fin boxes, leash plugs, hand grips and the like. The enhanced characteristics of the board insert 10 are attributable to a flange 12 extending radially outward from a central housing 14, wherein the flange 12 is formed from a pre-preg sheet. As will be described in more detail below, according to various embodiments, the pre-preg flange 12 is located between an outer fiberglass/polymer layer of the water sports board and an internal foam core such that the pre-preg flange 12 provides an intermediate bonding structure between the outer layer of the water sports board and the insert housing 14.

As used herein, the term "water sports boards" refers broadly to a broad class of devices, including but not limited to, surfboards, standup paddle boards, windsurf boards, boogie boards, paddle boards, wake boards, kite surfing boards, or other recreational equipment having an insert installed therein. Furthermore, the term "board insert" as used herein, broadly refers to a fin box, leash plug, handle mount, GPS mount, accessory mounts, hand grips, or other inserts which may be installed within a water sports board.

Referring now specifically to FIGS. 1-4, one embodiment of the board insert 10 is depicted and generally includes an insert body 15 having a central housing 14, a pre-preg flange/attachment element 12 extending radially outward from the housing 14, and a lip 16 coupled to the pre-preg flange 12 and housing 14. The pre-preg flange 12 is formed of a pre-preg sheet. As used herein, the term "pre-preg sheet" refers to a pre-impregnated sheet of structural strands bonded by a resin material. The structural strands may include carbon fiber strands, Kevlar™ strands, or strands formed from other materials known in the art. The structural strands preferably exhibit high tensile strength and toughness. The structural strands located within a given pre-preg sheet may be arranged in a woven configuration, or alternatively, in a non-woven configuration.

The pre-preg flange 12 includes a first surface 18, an opposing second surface 20, an inner bonding region/housing bonding region 22 (see FIG. 2) and an outer peripheral region/board attachment region 24. According to one embodiment, the inner bonding region 22 is disposed about a central axis 26 (see FIG. 3) which is also generally perpendicular to the first and second surfaces 18, 20. In the embodiment depicted in FIGS. 1-4, the inner bonding region 22 defines a pre-preg opening 28 disposed about the central axis 26, as well as a plurality of apertures 30 spaced from the pre-preg opening 28 and arranged about the pre-preg opening 28.

The housing 14 is coupled to the inner bonding region 22 and is sized and configured such that the outer peripheral region 24 of the pre-preg flange 12 extends radially outward from the housing 14. As shown in FIG. 1, the pre-preg flange 12 extends around the entirety of the housing 14. However, it is contemplated that other embodiments may include a flange which extends only partially around the housing, such as the embodiment depicted in FIG. 22, which will be discussed in more detail below.

The housing 14 includes a peripheral wall 32 and an end wall 34 which collectively define a housing cavity 36. The peripheral wall 32 includes an internal surface 38 facing the housing cavity 36, and an opposing external surface 40 facing away from the housing cavity 36. The peripheral wall 32 is disposed about the central axis 26 and extends away from the second surface 20 of the pre-preg flange 12 in a direction along the central axis 26.

The pre-preg flange 12 extends radially outward relative to the internal surface 38 and cavity 36 of the housing 14. As shown in FIG. 3, the inner-most portion of the flange 12 is spaced radially outward from the internal surface 38 of the housing 14, although it is contemplated that in other embodiments, the inner-most portion of the flange 12 may be flush with the internal surface 38 of the housing 14. Furthermore, as shown in FIGS. 1-4, the most radially outward portion of the flange 12 extends beyond the most radially outward portion of the housing 14. However, it is contemplated that in other embodiments, the housing 14 may extend to the most radially outward portion of the flange 12. For instance, the external surface 40 of the peripheral wall 32 may define an outer periphery that is substantially equal to the outer peripheral of the flange 12. In this respect, only the first surface 18 of the flange 12 may be exposed for bonding with an outer polymer coating.

The end wall 34 is coupled to the peripheral wall 32 and is spaced from the second surface 20 of the pre-preg flange 12. According to one embodiment, the end wall 34 extends generally orthogonal to the central axis 26 to define a closed end portion of the housing 14, although the end wall 34 may be arranged in a non-orthogonal configuration without departing from the spirit and scope of the present invention. It is also contemplated that the end wall 34 may not extend completely across the cavity 36. In this respect, the end wall 34 may include one or more openings formed therein without departing from the spirit and scope of the present invention.

The lip 16 is coupled to the peripheral wall 32 and extends around the central axis 26 to define a lip opening 42 in communication with the housing cavity 36. The lip 16 extends away from the peripheral wall 32 and terminates to define an upper lip surface 44 (see FIG. 4). The upper lip surface 44 and the external surface 40 of the peripheral wall 32, as well as the end wall 34 are disposed on opposed sides of the pre-preg flange 12. In this regard, the lip 16 generally extends in a first direction away from the first surface 18 of the pre-preg flange 12, while the peripheral wall 32 generally extends away from the second surface 20 in an opposing second direction.

A lip sidewall 45 extends between the first surface 18 of the flange 12 and the upper lip surface 44. The lip sidewall 45 preferably defines a conical or angled configuration, with the portion of the lip sidewall 45 disposed proximate the flange 12 having a larger periphery than the portion of the lip sidewall 45 disposed proximate the upper lip surface 44. The conical or angled configuration of the lip sidewall 45 may enhance the bonding between the lip 16 and the external polymer coating.

In the exemplary embodiment depicted in FIGS. 3 and 4, the lip 16 and housing 14 are integrally formed by a molded material which may extend through the pre-preg opening 28 and through the apertures 30.

According to one embodiment, the insert 10 is manufactured through an injection molding process, wherein the housing 14 and lip 16 are molded to the pre-preg flange 12. Along these lines, prior to the injection molding step, a pre-preg sheet is formed to define the desired outer peripheral shape of the flange 12. Furthermore, the pre-preg opening 28 and apertures 30 are stamped or otherwise formed within the sheet. Thereafter, the flange 12 is placed within a mold having a molding cavity corresponding to the shape of the housing 14 and lip 16. A material is then injected into the mold cavity to form the housing 14 and lip 16 which adheres to the pre-preg flange 12.

According to one embodiment, the pre-preg flange 12 becomes bonded to the injection molded housing 14 and lip 16 during the injection molding process. In this respect, the resin material in the pre-preg flange 12 may melt and bond to the injected material used to form the housing 14 and lip 16. It is also contemplated that in other embodiments, the formation of the housing 14 and lip 16 and the bonding of the pre-preg flange 12 thereto may be separate processes, wherein the pre-preg flange 12 is attached to or bonded to the housing 14 and lip 16 after forming the housing 14 and lip 16. When the flange 12 is bonded to an already formed housing 14 and lip 16, such bonding may be achieved by melting the resin in the pre-preg flange 12 and allowing the resin to adhere to the housing 14 and/or lip 16. It is also contemplated that the pre-preg flange 12 may be bonded to the already formed housing 14 and/or lip 16 through an adhesive or other bonding materials known in the art.

Although the foregoing describes the insert 10 as including an injection molded housing 14, it is understood that any portion of the insert body 15 may be at least partially formed from injection molded material. Along these lines, other embodiments may include a housing 14 formed of pre-preg material, while portions of the flange 12 are formed from injection molded material.

After the board insert 10 is constructed, it can be inserted within a recess 46 formed within a core 48 of the water sports board. As shown in FIGS. 3 and 4, the recess 46 is a stepped recess having a shallow portion 50 and a deep portion 52 which correspond to the cross sectional configuration of the insert 10, specifically the flange 12 and housing 14. In addition to the recess 46, the core 48 also defines an external surface 54. The board insert 10 is placed within the recess 46 such that the pre-preg flange 12 resides within the shallow portion 50 of the recess 46, while the housing 14 resides within the deep portion 52 of the recess 46. Preferably, the recess 46 and insert 10 are configured and adapted such that when the insert 10 is properly installed within the recess 46, the first surface 18 of the pre-preg flange 12 is substantially flush or coplanar with the external surface 54 of the core 48.

Although the foregoing describes installation of the insert 10 within a stepped recess, it is also understood that the insert 10 may be used in recesses which do not define a stepped configuration. In this regard, an ancillary structure may be inserted between the core 48 and the insert 10 to fill any gap within the recess 46.

Once the insert 10 is installed within the recess 46, a polymer coating 56 may be spread over the core 48 and the insert 10. According to one embodiment, the polymer coating 56 is a fiberglass-based coating, although other polymer coatings known in the art may also be used. A piece of tape 58 may be placed over the lip opening 42 to prevent the polymer coating 56 from flowing into the housing cavity 36. After the polymer coating 56 has been applied, the polymer coating 56 may be finished or sanded down such that the exposed surface 60 of the polymer coating 56 is substantially flush with the upper lip surface 44. Furthermore, the tape 58 may be removed to uncover the lip opening 42 and housing cavity 36.

Although the foregoing describes a method of installing an "assembled" insert 10 (e.g., including a housing 14 and a pre-preg flange 12) into the water sports board, it is additionally contemplated that the pre-preg flange 12 may become bonded to the housing 14 during application of the outer coating to the water sports board. In this respect, the housing 14 may initially be formed independent of the pre-preg flange 12. Along these lines, the housing 14 may initially include no flange, or alternatively, the housing 14 may include a preliminary flange formed from an injection molded material. The housing 14 may be placed within the recess formed 46, and a dry fiber sheet having a central opening corresponding to the housing 14 may be placed around the housing 14. A mixture of resin and a bonding catalyst, e.g., the coating 56, may be laminated over the core, fiber sheet and housing 14 and when the mixture hardens, the fiber sheet is attached to the housing 14 to define the flange 12.

Referring now specifically to FIGS. 5-7, there is depicted another embodiment of an insert 110 having a pre-preg flange 112, housing 114 and lip 116. The pre-preg flange 112 includes a first surface 118, an opposing second surface 120, an inner bonding region 122 and an outer peripheral region 124. The inner bonding region 122 includes a plurality of flaps 121, 123, 125, 127 which are foldable relative to the outer peripheral region 124 to form a portion of the housing 114. In particular, the pre-preg flange 112 includes a pair of opposed end flaps 121, 123 and a pair of opposed longitudinal side flaps 125, 127.

The flaps 121, 123, 125, 127 may be folded from an unfolded configuration, wherein the flaps 121, 123, 125, 127 are generally co-planar with each other and the outer peripheral region 124 (see FIG. 5), and a folded configuration, wherein the flaps 121, 123, 125, 127 are moved out of co-planar alignment with each other and the outer peripheral region 124 (see FIGS. 6 and 7). In one embodiment, the flaps 121, 123, 125, 127 are generally perpendicular to the outer peripheral region 124 when the flaps 121, 123, 125, 127 are in the folded configuration. The flange 112 may include serrations or score lines formed therein to facilitate folding of the flaps 121, 123, 125, 127 from the unfolded configuration to the folded configuration. When the flaps 121, 123, 125, 127 are transitioned into the folded configuration, a pre-preg opening 128 is formed within the flange 112.

The flaps 121, 123, 125, 127 may be formed by cutting or stamping the cut lines shown in FIG. 5. In particular, each end flap 121, 123 is separated from the adjacent side flaps 125, 127 by a pair of linear end cuts 131, and the two side flaps 125, 127 are separated by a longitudinal linear center cut 133. As shown in FIGS. 5-7, each end cut 131 extends from a terminal end of the center cut 133 toward a peripheral corner of the respective end flap 121, 125, which results in the end flaps 121, 125 defining a generally triangular configuration. Furthermore, the end cuts 131 and linear center cut 133 results in the side flaps 125, 127 having a generally trapezoidal configuration. However, those skilled in the art will appreciate that the flaps may be configured to define other sizes and shapes.

The housing 114 and lip 116 are formed via an injection molding process, wherein the flange 112 is placed within the mold during the injection molding process. In particular, the flaps 121, 123, 125, 127 are placed in the folded configuration such that when the housing 114 is formed, the flaps 121, 123, 125, 127 are bonded to the injection molded portion of the housing 114, and thus, the flaps 121, 123, 125, 127 form a portion of the housing 114. In the particular embodiment shown in FIG. 7, the outer surfaces of the flaps 121, 123, 125, 127 are substantially flush with an external surface of the injection molded portion of the peripheral wall 132. However, it is understood that the flaps 121, 123, 125, 127 may be completely embedded within the injection molded portion of the peripheral wall 132, or alternatively, the flaps 121, 123, 125, 127 may be flush with an internal surface of the injection molded portion of the peripheral wall.

Once formed, the insert 110 may be installed within the water sports board in the same manner as discussed above in relation to insert 10 discussed above.

Referring now to FIGS. 8 and 9, there is shown another embodiment of an insert 210 having a pre-preg flange 212, a housing 214 and a lip 216, wherein the pre-preg flange 212 differs slightly from the flange 112 discussed above. In particular, the flange 212 includes a first surface 218, an opposing second surface 220, an inner bonding region 222 and an outer peripheral region 224. The inner bonding region 222 includes a plurality of flaps 221, 223, 225, 227 which are foldable relative to the outer peripheral region 224. In particular, the pre-preg flange 212 includes a pair of opposed end flaps 221, 223 and a pair of opposed longitudinal side flaps 225, 227. The flange 212 additionally includes a plurality of apertures 230a, 230b extending between the first and second surfaces 218, 220 and formed within the inner bonding region 222. The apertures 230a are formed on the flaps 221, 223, 225, 227, while the apertures 230b are formed radially outward of the flaps 221, 223, 225, 227.

The insert 210 is formed via an injection molding process, wherein the pre-preg flange 212 is placed within a mold used to form the housing 214 and the lip 216. The injection molded material used to form the housing 214 and lip 216 may flow through the apertures 230a formed on the flaps 221, 223, 225, 227 to provide enhanced bonding between the pre-preg flange 212 and the injection molded housing 214. Depending on the thickness of the housing 214, the injection molded material may also flow through the apertures 230b disposed radially outward of the flaps 221, 223, 225, 227. As an alternative, the apertures 230b may be used to allow a polymer material to flow therethrough when the insert 210 is installed on the water sports board. In this respect, the apertures 230b may enhance the bonding between the outer polymer coating 256 and the insert 210.

Referring now to FIG. 10, there is depicted another embodiment of a pre-preg flange 312 which may be used to construct a board insert. The pre-preg flange 312 is very similar to the pre-preg flange 112 described above and shown in FIGS. 5-7, with the primary distinction being that the flange 312 includes non-linear, sinusoidal shaped cuts. In particular, the flange 312 includes a non-linear longitudinal center cut 333 and a plurality of non-linear end cuts 331 extending from terminal ends of the center cut 333. The cuts 331, 333 define flaps 321, 323, 325, 327 which are foldable so as to extend along portions of the insert housing, as described above.

Referring now to FIG. 11, there is depicted yet another embodiment of a pre-preg flange 412 which may be implemented with a board insert. The pre-preg flange 412 is very similar to the pre-preg flange 212 described above and depicted in FIGS. 8-9. The primary distinction between the flange 412 and the flange 212 is that the flange 412 includes non-linear, sinusoidal shaped cuts. In particular, the flange 412 includes a non-linear center cut 433 and a plurality of non-linear end cuts 431 extending from terminal ends of the center cut 433. The cuts 431, 433 define flaps 421, 423, 425, 427 which are foldable so as to extend along portions of the insert housing, as described above. The flange 412 also includes a plurality of openings 430a, 430b which are similar to the openings 230a, 230b discussed above.

Referring now to FIGS. 12-14 there is shown another embodiment of a board insert 510 embodied as a leash plug. The leash plug 510 includes a pre-preg flange 512, a housing 514 and a lip 516. The leash plug 510 further includes a leash attachment bar 515 extending across a housing cavity 536 between opposed sides of a peripheral wall 532.

The pre-preg flange 512 includes a first surface 518, an opposed second surface 520, an outer peripheral region 524 and an inner bonding region 522 having a pre-preg opening 528. The inner bonding region 522 defines an inner periphery 525 about the pre-preg opening 528, wherein the inner periphery 525 includes non-linear segments defining a series of alternating fingers 527 and gaps 529. In the embodiment depicted in FIG. 13, the alternating fingers 527 and gaps 529 extend along a longitudinal side of the inner periphery 525, while the opposed ends of the inner periphery 525 are substantially linear. However, it is understood that the ends may also be non-linear, while the sides may be substantially linear.

The housing 514 and lip 516 are formed via injection molding, wherein the pre-preg flange 512 is placed within a mold such that the housing 514 and lip 516 are formed to engage with the flange 512. In particular, the housing 514 is formed with the fingers 527 extending into the peripheral wall 532 of the housing 514 and the injected material is disposed within the gaps 529. FIG. 14 is a top view with a portion of the lip 516 being removed to illustrate the interface between the fingers 527 and the injection molded material, i.e., the fingers 527 extending under a portion of the lip 516 and through a portion of the peripheral wall 532 and the gaps 529 are filled with injection molded material.

Referring now to FIG. 15, there is depicted an embodiment of a pre-preg flange 612 configured for use with a leash plug or other board insert. The pre-preg flange 612 is similar to the flange 12 discussed above and shown in FIG. 2. In particular, the pre-preg flange 612 includes a peripheral region 624, an inner bonding region 622 having a pre-preg opening 628 and a plurality of apertures 630 disposed about the pre-preg opening 628. The primary distinction between the pre-preg flange 612 and the pre-preg flange 12 relates to the size of the flange, with the flange 12 being more elongate.

FIG. 16 shows another embodiment of a pre-preg flange 712 similar to the pre-preg flange 112 discussed above and shown in FIGS. 5-7. In particular, the pre-preg flange 712 includes a first surface 718, an opposing second surface, an inner bonding region 722 and an outer peripheral region 724. The inner bonding region 722 includes a plurality of flaps 721, 723, 725, 727 which are foldable relative to the outer peripheral region 724. In particular, the pre-preg flange 712 includes a pair of opposed end flaps 721, 723 and a pair of opposed longitudinal side flaps 725, 727. The flaps 721, 723, 725, 727 are separated by end cuts 731 and a longitudinal center cut 733. The primary distinction between the pre-preg flange 712 and the pre-preg flange 112 relates to the size of the flange, with the flange 112 being more elongate.

Referring now to FIG. 17, a board insert 810 is shown having a pre-preg flange 812, a housing 814 having a housing cavity 836, and a lip 816. The housing 814 includes an injection molded peripheral wall 832 and an end wall 834 at least partially formed from a pre-preg material 835. The pre-preg material 835 used in the end wall 834 may be the same pre-preg material used to form the flange 812 or a different pre-preg material. The pre-preg flange 812 may be configured similar to the flanges 12, 512, 612 discussed above.

When the board insert 810 is formed, the pre-preg flange 812 and the pre-preg material 835 are inserted into the mold and the injection molded material is injected therein to form the peripheral wall 832, an injection molded portion 837 of the end wall 834, and the lip 816. It is understood that the pre-preg material 835 may have a surface that is exposed on along an external surface of the end wall 834, or an internal surface of the end wall 834. Alternatively, the pre-preg material 835 may be completely encapsulated within the end wall 834. Once the insert 810 is formed, the insert 810 may be installed into the water sports board as described above.

Figure 17A:
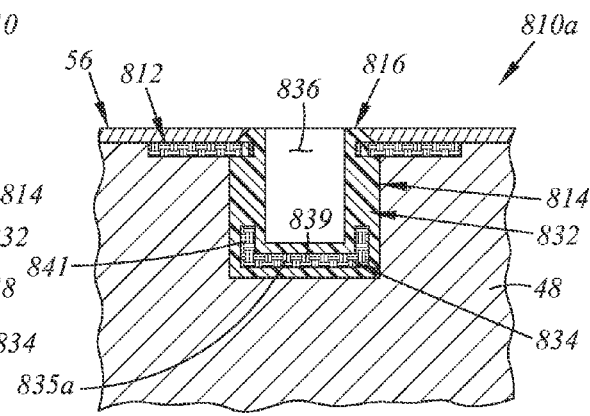
FIG. 17a is a side sectional view of an embodiment of an installed board insert having a pre-preg flange, a molded lip and a housing including a pre-preg sheet disposed within the end wall and having folded end portions extending into the peripheral wall of the housing.

FIG. 17a shows a variation of the embodiment depicted in FIG. 17, with the primary distinction being that the insert 810a includes pre-preg material 835a having a central end wall portion 839 and a peripheral wall portion 841 folded relative to the central portion 839 and positioned outward relative to the central portion 839. The peripheral wall portion 841 extends toward the flange 812 to form a portion of the peripheral wall 832. In this respect, the peripheral wall portion 841 may be completely encapsulated within the peripheral wall 832 or may be exposed along an outer or inner portion of the peripheral wall 832.

Figure 17B:
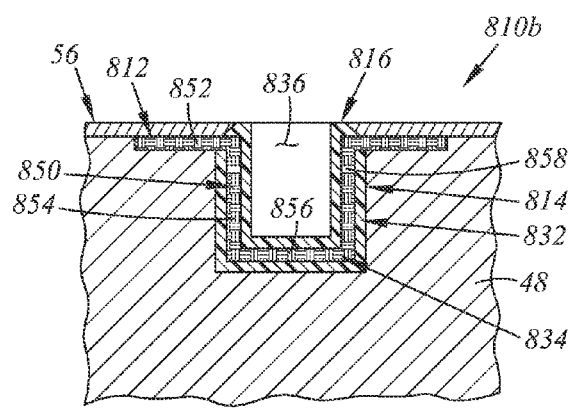
FIG. 17b is a side sectional view of an embodiment of an installed board insert having a pre-preg sheet forming a flange and extending within the peripheral wall and end wall of the housing.

FIG. 17b is yet another embodiment wherein portions of the end wall 834 and peripheral wall 832 include pre-preg material. In the embodiment shown in FIG. 17b, the insert 810b includes a single sheet 850 of pre-preg material extending along the flange 812, through the peripheral wall 832 and along end wall 834. In this regard, the sheet 850 includes a flange portion 852, a peripheral wall portion 854 and an end wall portion 856, wherein the flange portion 852, peripheral wall portion 854 and end wall portion 856 form a unitary structure. The sheet 850 may include one or more apertures 858 to allow injection molded material to flow through the sheet 850 during the molding process.

Figure 18:
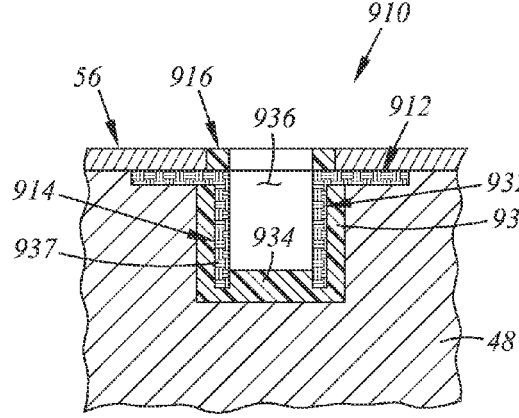
FIG. 18 is a side sectional view of an embodiment of an installed board insert having a pre-preg sheet forming a flange and a portion of the peripheral wall.
Figure 19:
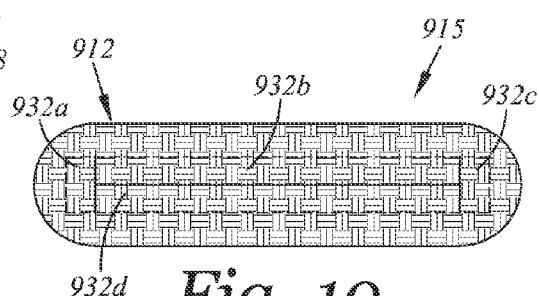
FIG. 19 is a top view of the pre-preg sheet used in the board insert shown in FIG. 18.

FIGS. 18 and 19 show another embodiment of a board insert 910 having a pre-preg flange 912, a housing 914 having a housing cavity 936, and a lip 916. The housing 914 includes peripheral wall 932 formed of a combination of pre-preg material 937 and injection molded material 938, and an end wall 934 formed from injection molded material. The peripheral pre-preg material 937 is preferably an integral part of the flange 912, i.e., the flange 912 and peripheral pre-preg material 937 are preferably formed of a single sheet of pre-preg material. Along these lines, the pre-preg sheet 915 used to form the flange 912 and at least a portion of the peripheral wall 932 may include peripheral wall flaps 932a, 932b, 932c, 932d disposed inwardly from the flange 912 and foldable relative to the flange 912.

When the board insert 910 is formed, the pre-preg flange 912 and the pre-preg peripheral wall material 937 are inserted into the mold, and the injection molded material is injected therein to form the end wall 934, lip 916, and portions of the peripheral wall 932. Once the insert 910 is formed, the insert 910 may be installed into the water sports board as described above.

FIG. 20 shows an additional embodiment of an insert 950 having a flange 952, a lip 953, and an insert housing 954 comprised of a peripheral wall 956 and an end wall 958. The insert 950 includes a first pre-preg sheet 960 and a second pre-preg sheet 962. The first pre-preg sheet 960 comprises a first segment 964 which defines the flange 952 and a second segment 966 which defines a portion of the peripheral wall 956. The second pre-preg sheet 962 includes a first segment 968 defining a portion of the peripheral wall 956 and a second segment 970 defining a portion of the end wall 958. According to one embodiment, a portion of the second segment 966 of the first pre-preg sheet 960 overlaps a portion of the first segment 968 of the second pre-preg sheet 962. The first and second pre-preg sheets 960, 962 are at least partially bonded to each other at the overlapping portion via the resin material pre-impregnated in the sheets 960, 962.

In addition to the pre-preg sheets 960, 962, the housing 954 includes portions formed from injection molded material (e.g., plastic). More specifically, the peripheral wall 956 includes an upper injection molded portion 972 disposed radially outward from the second segment 966 of the first pre-preg sheet 960 and a lower injection molded portion 974 disposed radially inward from the first segment 968 of the second pre-preg sheet 962. The end wall 958 also includes an injection molded portion 976 disposed inwardly of the second segment 970 of the second pre-preg sheet 962. One or both of the first and second pre-preg sheets 960, 962 may include one or more openings to facilitate the flow of injection molded material therethrough.

The position of the injection molded portions 972, 974, 976 relative to the pre-preg sheets 960, 962 shown in FIG. 20 and described above are exemplary in nature only. In this respect, any injection molded portion 972, 974, 976 may be positioned on the inside of the respective sheet 960, 962, or alternatively, may be positioned on the outside of the respective sheet 960, 962.

The lip 953 shown in FIG. 20 is formed from an injection molded material, although it is also understood that in other embodiments, the lip 953 may be formed from pre-preg material.

FIGS. 21 and 22 show a further embodiment of an insert 1010 having a pre-preg flange 1012, a housing 1014 having a housing cavity 1036, and a lip 1016. The housing 1014 includes an injection molded peripheral wall 1032 and an end wall 1034. The pre-preg material used to form the lip 1016 may be the same pre-preg material used to form the flange 1012 or a different pre-preg material. The pre-preg flange 1012 may be configured similar to the flanges 12, 512, 612 discussed above.

When the board insert 1010 is formed, the pre-preg flange 1012 and the pre-preg lip 1016 are inserted into the mold, and the injection molded material is injected therein to form the peripheral wall 1032 and end wall 1034. Once the insert 1010 is formed, the insert 1010 may be installed into the water sports board as described above.

FIG. 21a depicts another variation of the insert shown in FIGS. 21 and 22. In the embodiment depicted in FIG. 21a, the insert includes a single, unitary pre-preg sheet 1020 which forms the flange 1012a and at least a portion of the lip 1016a. In this respect, the pre-preg sheet 1020 includes a flange portion 1022 and a lip portion 1024, wherein the lip portion 1024 is angled from the flange portion 1022 to extend toward the outer surface of the water sports board and thereby define the lip 1016*a*.

Referring now to FIG. 23, there is shown another embodiment of a board insert 1110 having a pre-preg flange 1112, a housing 1114 and a lip 1116. The pre-preg flange 1112 includes separate flange pieces 1113, 1115, 1117, 1119. In this respect, it is expressly contemplated that certain embodiments of the flange 1112 extend from discrete portions of the housing 1114, and thus, the flange 1112 does not completely circumnavigate the housing 1114. Each flange piece includes opposed first and second surfaces and functions in a similar manner to the flanges discussed above. In this respect, the flange pieces 1113, 1115, 1117, 1119 provide an intermediate bond between the external polymer coating 56 and the housing 1114.

When the insert 1110 is formed, the individual flange pieces 1113, 1115, 1117, 1119 may be placed within a mold and the injection molded material is injected into the mold to form the housing 1114 and lip 1116 to the flange pieces 1113, 1115, 1117, 1119.

Referring now to FIG. 24, there is depicted a further embodiment of a board insert 1210. The primary distinction between the board insert 1210 shown in FIG. 24 and the board inserts discussed above is that the board insert 1210 includes a pre-preg flange 1212 adjacent a closed end portion of an insert housing 1214, rather than being adjacent the open end portion of the housing 1214. In this respect, the insert housing 1214 includes a peripheral wall 1216 and an end wall 1218 coupled to the peripheral wall 1216 to define a cavity 1220 and the closed end portion of the housing 1214. As shown in the exemplary embodiment, the pre-preg flange 1212 is disposed adjacent an outer surface of the end wall 1218. It is also contemplated that the pre-preg flange 1212 may include a central opening which at least partially receives the housing 1214. A plurality of support members 1222 extend between the pre-preg flange 1212 and the peripheral wall 1216 for additional support.

According to one embodiment, when the board insert 1210 is installed within the water sports board, the pre-preg flange 1212 is spaced from the outer surface of the core. In this respect, the pre-preg flange 1212 is not directly bonded to the polymer coating disposed on the outer surface of the board core. Rather, the pre-preg flange 1212 is bonded to the insert housing 1214 and the board core. The pre-preg flange 1212 may be bonded to the board core using the resin material pre-impregnated within the flange 1212, as well as adhesives or other bonding agents known in the art. A filling element 1224 may extend around the peripheral wall 1214 and away from the pre-preg flange 1212. The filling element 1224 may be formed from a material similar to the board core (e.g., foam) and includes an outer surface 1225 configured to be substantially flush with the outer surface of the board core. In this regard, the filling element 1224 may also be bonded to the polymer coating.

A lip 1226 may be formed by extending the peripheral wall 1214 beyond the outer surface 1225 of the filling element 1224. In this respect, the lip 1226 and the peripheral wall 1214 may be a unitary structure. However, it is also contemplated that the lip 1226 may be a separate element, which may be formed from pre-preg material, as is described in more detail above.

Although the foregoing describes various embodiments of an insert which may be used in a wide range of water sports boards for several different purposes, it is also contemplated that other embodiments of the present invention may include inserts used in other vehicles or vessels for mounting one part to another. In this respect, the insert may be placed within any underlying base structure for connecting the base structure to a projecting structure. As described above, the "base structure" is the water sports board, although the base structure may include other structures. For instance, the base structure may be a sailboat, and the insert may be coupled to the sailboat for mounting a projecting structure, such as a mast, to the hull of the boat. Alternatively, the base structure may be a vehicle frame for mounting an antenna, mirror or other projecting structure to the vehicle frame. It is also that the base structure may be a building, and the insert may be coupled to the building for purposes of serving as a mount for a flagpole. As such, it is expressly contemplated that the scope of the present invention is not limited solely to an insert for a water sports board, and that the insert may be used in a wide range of applications for joining two structures together.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of constructing a board insert configured for use with a water sports board, the method comprising the steps of:
    providing a pre-preg flange formed of a pre-preg sheet, the pre-preg sheet including a plurality of structural strands bonded by a resin material, the pre-preg flange having:
        opposed first and second surfaces;
        an outer peripheral region configured to be attachable to the water sports board; and
        an inner bonding region radially inward of the outer peripheral region and disposed about a central axis;
    forming a pre-preg opening within the inner bonding region, the pre-preg opening being disposed about the central axis;
    placing the pre-preg flange within a mold cavity; and
    injecting a polymer material into the mold cavity to at least partially form an insert housing within the pre-preg opening, the insert housing extending through the pre-preg flange adjacent the inner bonding region along the central axis, the insert housing being bonded to the inner bonding region of the pre-preg flange with the outer peripheral region of the pre-preg flange extending radially outward from the insert housing, the insert housing having:
        a peripheral wall disposed about the central axis and extending away from the second surface of the pre-preg flange; and
        an end wall coupled to the peripheral wall with the peripheral wall disposed between the end wall and the second side of the pre-preg flange, the end wall extending generally orthogonal to the central axis, the peripheral wall and end wall collectively defining a cavity; and
    forming a lip coupled to the peripheral wall and extending around the central axis to define a lip opening in communication with the cavity, the lip extending away from the peripheral wall with the first surface disposed between the lip and the peripheral wall, the lip defining a distal end portion disposed about the lip opening and spaced from the first surface.

2. The method recited in claim 1, further including the step of:
forming at least one aperture within the inner bonding region, a portion of the insert housing extending through the at least one aperture.

3. The method recited in claim 2, wherein the step of forming the at least one aperture includes forming the at least one aperture to be in communication with the pre-preg opening.

4. The method recited in claim 2, wherein the step of forming the at least one aperture includes forming the at least one aperture in spaced relation to the pre-preg opening.

5. The method recited in claim 2, wherein the injecting step includes injecting the polymer material through the at least one aperture.

6. A method of forming a water sports board, the method comprising the steps of:
providing a core having a core external surface and a recess extending into the core from the core external surface;
providing an insert box including:
a pre-preg flange formed of a pre-preg sheet, the pre-preg sheet including a plurality of structural strands bonded by a resin material, the pre-preg flange having:
opposed first and second surfaces;
an outer peripheral region configured to be attachable to the water sports board; and
an inner bonding region disposed radially inward of the outer peripheral region and disposed about a central axis; and
an insert housing formed at least partially from an injection molded material, the insert housing extending through the pre-preg flange adjacent the inner bonding region along the central axis, the insert housing being bonded to the inner bonding region of the pre-preg flange with the outer peripheral region of the pre-preg flange extending radially outward from the insert housing, the insert housing having:
a peripheral wall disposed about the central axis and extending away from the second surface of the pre-preg flange; and
an end wall coupled to the peripheral wall with the peripheral wall disposed between the end wall and the second side of the pre-preg flange, the end wall extending generally orthogonal to the central axis, the peripheral wall and end wall collectively defining a cavity; and
a lip coupled to the peripheral wall and extending around the central axis to define a lip opening in communication with the cavity, the lip extending away from the peripheral wall with the first surface disposed between the lip and the peripheral wall, the lip defining a distal end portion disposed about the lip opening and spaced from the first surface;
placing the insert within the recess, the pre-preg flange residing within the recess; and
applying a polymer coating over the core and the first surface of the pre-preg flange about the lip opening, the polymer coating being bonded to insert housing via the pre-preg flange.

7. The method recited in claim 6, wherein the pre-preg opening defines an inner periphery, the method further including the step of:
forming at least one aperture formed within the inner bonding region, a portion of the insert housing extending through the at least one aperture.

\* \* \* \* \*